Figure 1:
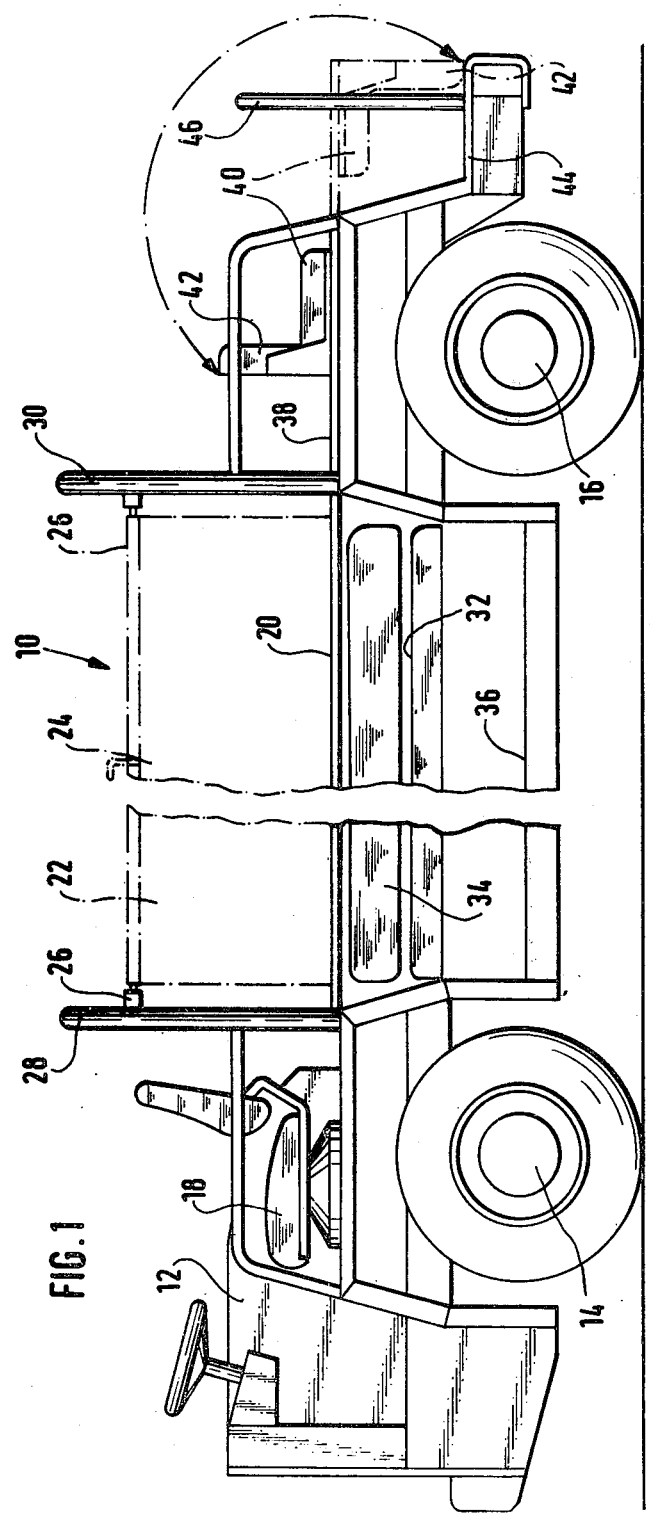

United States Patent [19]

Schopf

[11] 4,162,099

[45] Jul. 24, 1979

[54] MOTOR-DRIVEN VEHICLE, ESPECIALLY FOR USE IN MINING OPERATIONS

[75] Inventor: Jörg Schopf, Stuttgart, Fed. Rep. of Germany

[73] Assignee: Schopf Maschinenbau GmbH, Stuttgart, Fed. Rep. of Germany

[21] Appl. No.: 816,663

[22] Filed: Jul. 18, 1977

[30] Foreign Application Priority Data

Jul. 17, 1976 [DE] Fed. Rep. of Germany ........ 2632246

[51] Int. Cl.² .............................................. B62D 33/00
[52] U.S. Cl. ...................................... 296/63; 296/178; 296/183
[58] Field of Search ............... 296/63, 64, 28 R, 28 C, 296/1 R

[56] References Cited

U.S. PATENT DOCUMENTS 2,704,989   3/1955   Konecny ................................ 296/63

Primary Examiner—Philip Goodman

[57] ABSTRACT

A motor-driven vehicle for selective use for transporting material and for transporting personnel, especially for use in underground mining operations, with a loading platform for the material to be transported. Below the loading platform parallel to the two longitudinal boundaries of the vehicle one bench or seat row each for transporting persons is provided. The area of the loading platform covering the respective bench or seat row is constructed as a loading platform part pivotable upwardly about an axis extending in the longitudinal direction of the vehicle and adapted to be locked in the upwardly pivoted position.

6 Claims, 2 Drawing Figures

MOTOR-DRIVEN VEHICLE, ESPECIALLY FOR USE IN MINING OPERATIONS

The invention relates to motor-driven vehicles, particularly for use in underground mining operations.

In underground mines, more particular in potash and salt mines, which are not endangered by miners damp, diesel-driven railless machinery and transportation vehicles are being increasingly used, while in addition vehicles for transporting personnel are required because of the sometimes substantial distances between the working stations. Therefore, larger potash mines have a comprehensive underground wagon park.

It is the object of the invention to provide a self-propelled vehicle with a loading platform for transporting material which can be used without substantial refitting at any time, for example at the beginning of a shift and at the end of a shift, as a personnel carrier so that no separate vehicles for transporting material and personnel respectively are required.

In a motor-driven vehicle with a loading platform for the material to be transported this problem has been solved in accordance with the invention by providing below the loading platform parallel to the two longitudinal limits of the vehicle one row of benches or seats each for the persons to be transported; and by designing the area of the loading platform which covers the respective row of benches or seats as a part of the loading platform which can be tilted upwardly about an axis extending in the longitudinal direction of the vehicle and which can be locked in the upwardly tilted position. The seats necessary for the accident-proof transportation of the persons, therefore, do not have to be mounted on the loading platform when persons are to be transported, but the seats are fixedly mounted underneath the loading platform and are available at any time upon pivoting upwardly the corresponding parts of the loading platform.

In a preferred embodiment of the invention, the bench or seat rows are provided with back rests directed towards the central axis of the vehicle, and the seat surfaces of each bench or seat row are arranged offset inwardly towards the central axis of the vehicle with respect to the outer vehicle boundaries to such an extent that within the longitudinal limits of the vehicle there is still room for a footrest at a suitable height for the persons to be transported. With a thus equipped vehicle, therefore, two groups of persons sitting back to back and transversely to the direction of travel can be transported while the offset arrangement of the rows of seats excludes danger to the transported persons by other vehicles and the like.

Preferably, the pivotal connection of the loading platform parts at the vehicle body is provided in the region of their adjacent inner longitudinal edges facing away from the outer lateral longitudinal boundaries of the vehicle. It is recommended that the loading platform parts are so constructed that they can be pivoted upwardly until their free outer edges engage and to provide within the area of the edges located adjacent each other in the upwardly pivoted position, a locking device for locking the loading platform parts to each other.

The locking device can for instance be designed as a bascule or bolt-type closure.

If the vehicle is to be operated for transporting a smaller number of people with only one loading platform part pivoted upwardly, while the remaining loading platform remains usable for the transport of material, it is advantageous to assign to each loading platform part its own locking device by means of which the upwardly tilted loading platform part can be separately locked to the vehicle body.

Since the upwardly pivotable loading platform parts can have a considerable weight, especially with larger transport vehicles, a further development according to the invention provides that each loading platform part has associated therewith at least one gas pressure spring connected with the vehicle body on one hand and the loading platform part on the other, which spring at least partly compensates for the weight of the loading platform part to be pivoted upwardly during the pivoting operation and which in addition prevents the sudden drop of the loading platform part after unlocking when changing over from personnel transport to material transport.

In order to utilize also the part of the loading platform located behind the rear axle of the vehicle for the transportation of personnel, the loading platform at the rearward end of the vehicle may be provided with a loading platform part which may be folded back by 180° upon itself about an axis extending transverse to the longitudinal axis of the vehicle. An additional bench or seat row arranged transversely to the longitudinal axis of the vehicle is provided on the bottom side of the loading platform part which in the pivoted position thereof is located on top. Advantageously, the bench or seat rows are arranged with their back rests facing the front end of the vehicle and to provide a footrest for the persons to be transported, below the loading platform part that can be pivoted backward, the persons looking backwards in the direction of travel.

Figure 2:
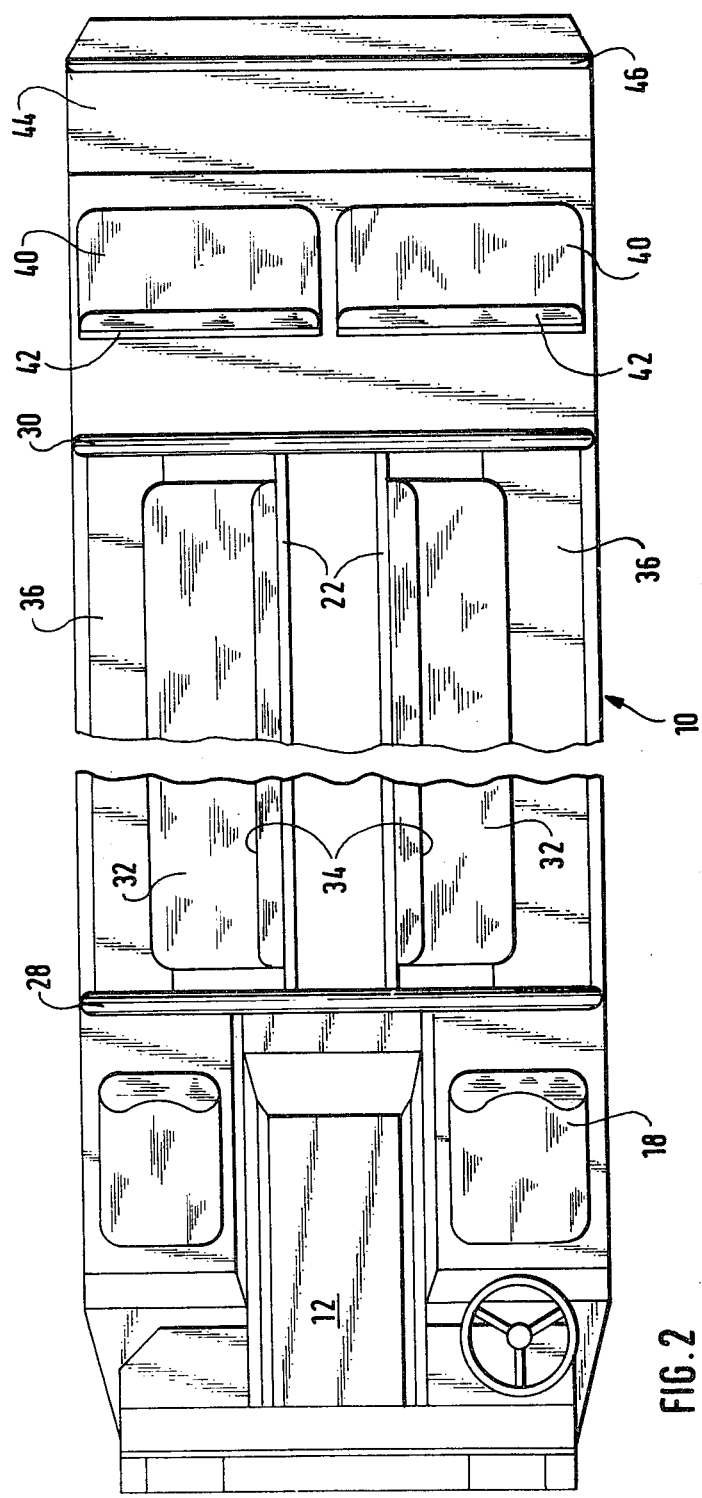

The invention is further explained in the following description of an embodiment in connection with the drawing. More specifically:

FIG. 1 shows a diagramatic side view of a vehicle according to the invention, usable for transporting material and carrying personnel; and FIG. 2 shows a top view of the vehicle according to the invention shown in FIG. 1.

The vehicle shown in the drawing figures and designated in its entirety with reference numeral 10 is intended for use in underground mining operations; it should however be remarked that naturally it is possible to use the same above ground in factory grounds or in street traffic when observing the legal regulations provided for public street traffic.

The vehicle can be powered in a manner known per se by a diesel motor arranged below the hood 12 through a mechanical manual transmission or an automatic hydraulic transmission to the front axle 14 and/or the rear axle 16 of the vehicle, and the steering operated from the driver seat 18 may be constructed as a front axle steering or as all-wheel steering which may be advantageous in the confined conditions underground. The drive and the steering of the vehicle are, however, not essential for the inventive idea so that the preceding short remarks may suffice.

It is, however, essential for the invention that the loading platform of the vehicle 10, designated in its entirety with 20, is divided into several parts, while the two loading platform parts 22 situated on the outside in the area between the vehicle axles 14 and 16 are constructed so as to be pivotable upwardly respectively about an axis extending parallel to the central axis of the vehicle. In FIG. 1 the loading platform parts 22 are shown in dot-dash lines in the upward pivoted position.

A bascule or bolt-type lock 24 only diagramatically indicated in FIG. 1 makes it possible to lock the upwardly pivoted loading platform parts 22 to each other. Alternatively or in addition, also the locking devices 26 likewise only schematically illustrated may be provided by means of which the loading platform parts may be fixed to guard rails 28 and 30 respectively of strong tubular material which are provided in the front and rear area of the loading platform 20.

The upwardly pivoted loading platform parts 22 reveal one bench 32 each extending in the travelling direction, with back rests 34 arranged back to back while the seating surfaces of the benches 32 are moved towards the interior of the vehicle so far that underneath the longitudinal boundaries of the vehicle still a sufficient space remains for the arrangement of the footrest 36 for the persons to be transported. The footrest 36, just like the parts of the vehicle carrying the bench 32 and the back rests 34 form the body or chassis of the vehicle 10.

In order to facilitate the upward pivoting of the loading platform parts 22 and to prevent an accidental dangerous downward pivoting of the loading platform parts 22 with high speed, gas pressure springs (not shown) may be provided which intercept the loading platform parts 22 at the body of the vehicle 10.

Since the loading platform 20 extends beyond the rear axle 16, in the manner customary with trucks, in the illustrated vehicle 10 also the rearward loading platform part is made usable for transporting persons in that this rearward platform 38 is likewise pivotable about an axis which in this case however extends transverse to the longitudinal axis of the vehicle onto the area of the loading platform 20 above the rear axle 16. The loading platform part 38 is also in contrast to the loading platform parts 22 not only pivotable upwardly by approximately 90°, but by 180°. At the bottom side of the pivotable loading platform part 38 there is again provided a bench 40 with back rests 42 facing forward in the travelling direction, said bench, however, now extending transverse to the travelling direction. This bench, therefore, normally is located underneath the loading platform, but can be brought without difficulty into the position shown in the drawing suitable for transporting persons, after pivoting of the loading platform 38. Below the pivotable loading platform part 38 there is again provided a foot rest 44 which carries a guard rail 46 of tubular material which protects the persons to be transported on the bench 40.

I claim:

1. A self-propelled, motor-driven, steerable vehicle having a vehicle body with at least two axles and substantially parallel longitudinal boundaries, for selectively transporting material and personnel, especially for use in underground mining operations, comprising: a plane, substantially uninterrupted loading platform for the material to be transported, two benches or seat rows for transporting persons, said benches or rows being arranged below the loading platform opposite each other and respectively parallel to the longitudinal boundaries of the vehicle, said loading platform having parts respectively covering each bench or seat row, and means pivotally connecting said loading platform parts at said vehicle body so as to be respectively pivotable upwardly about an axis extending in the longitudinal direction of the vehicle substantially parallel to said longitudinal boundaries, and means for locking said parts in their upwardly pivoted position, said bench or seat rows having back rests facing towards said longitudinal axis of the vehicle and having seat surfaces arranged offset with respect to said longitudinal boundaries inwardly towards said longitudinal axis of said vehicle so far that within the longitudinal vehicle boundaries a space is left, and a foot rest arranged at a suitable height for the persons to be transported and arranged in said space, said means for pivotally connecting said loading platform parts at the vehicle body being provided in the area of their adjacent, inner longitudinal edges facing away from the outer longitudinal boundaries of the vehicle.

2. A vehicle according to claim 1, wherein said loading platform parts are pivotable upwardly until their free outer edges about each other, said locking means being provided in the area of the edges engaging each other in the upward pivoted position.

3. A vehicle according to claim 2, wherein said locking means is constructed as a bascule lock.

4. A vehicle according to claim 1, comprising at least one gas pressure spring associated with each loading platform part and connected with said vehicle body and said loading platform part, said spring balancing the weight of the loading platform part to be pivoted upwardly during pivoting at least partially.

5. A vehicle according to claim 1, wherein said loading platform is provided at the rearward end of said vehicle with a further loading platform part, means for pivoting said further loading platform part back upon itself by 180° about an axis extending transverse to said longitudinal axis of said vehicle, said further loading platform part being provided with an additional bench or seat row arranged transverse to the longitudional axis of the vehicle on the underside thereof, said underside in pivoted position being located on top.

6. A vehicle according to claim 5, wherein said additional bench or seat row has a back rest facing towards the front end of the vehicle, and a foot rest below said further loading platform part.

* * * * *